United States Patent
Lowes et al.

(10) Patent No.: US 9,176,789 B2
(45) Date of Patent: Nov. 3, 2015

(54) CAPACITY CONTROL

(75) Inventors: Raymond Lowes, Barnsley (GB); Jonathan Davies, Barnsley (GB)

(73) Assignee: HSBC GROUP MANAGEMENT SERVICES LIMITED, London (GB)

(*) Notice: Subject to any disclaimer, the term of this patent is extended or adjusted under 35 U.S.C. 154(b) by 755 days.

(21) Appl. No.: 13/126,627

(22) PCT Filed: Oct. 28, 2009

(86) PCT No.: PCT/GB2009/051449
§ 371 (c)(1),
(2), (4) Date: Aug. 30, 2011

(87) PCT Pub. No.: WO2010/049732
PCT Pub. Date: May 6, 2010

(65) Prior Publication Data
US 2011/0302301 A1    Dec. 8, 2011

(30) Foreign Application Priority Data
Oct. 31, 2008   (EP) .................................... 08253584

(51) Int. Cl.
*G06F 15/16*       (2006.01)
*G06F 9/50*        (2006.01)

(52) U.S. Cl.
CPC ........ *G06F 9/5083* (2013.01); *G06F 2209/508* (2013.01); *G06F 2209/5019* (2013.01)

(58) Field of Classification Search
CPC ..... H04L 41/147; H04L 47/823; H04L 43/04; H04L 41/5096; H04L 47/70; H04L 47/822; G06F 9/5072
USPC .......................................... 709/200, 223, 224
See application file for complete search history.

(56) References Cited

U.S. PATENT DOCUMENTS

| | | | | |
|---|---|---|---|---|
| 5,475,668 A | * | 12/1995 | Azumatani et al. | 369/47.14 |
| 5,968,116 A | * | 10/1999 | Day et al. | 709/202 |
| 5,974,237 A | * | 10/1999 | Shurmer et al. | 709/224 |
| 6,351,775 B1 | * | 2/2002 | Yu | 709/238 |
| 6,393,387 B1 | * | 5/2002 | Adriaans et al. | 703/27 |
| 6,446,123 B1 | * | 9/2002 | Ballantine et al. | 709/224 |

(Continued)

OTHER PUBLICATIONS

Peter J. Brockwell and Richard A. Davis, Introduction to Time Series Forecasting, 2002, Springer 2nd Ed., pp. 1-44.*

(Continued)

*Primary Examiner* — Anthony Mejia
(74) *Attorney, Agent, or Firm* — Stroock & Stroock & Lavan LLP

(57) ABSTRACT

There are described a system, apparatus and/or method according to which collected history data from monitorable and/or manageable entities within a server estate or data center is used to tailor a model to the past behavior and/or loading upon individual ones or parts of ones of the entities. The tailored model can then be used to predict a future value for one or more metrics included in the history data for an entity or part of an entity under consideration. The predicted value can then be used to determine whether some form of corrective action is required in respect of the entity, entity part or some other entity or entity part. Alternatively or in addition, predicted values for more than one entity or entity part can be aggregated to determine whether some form of corrective action is required in respect of the entity, entity part or some other entity or entity part. A corrective action can be applied on an automated or on a manual basis.

18 Claims, 4 Drawing Sheets

(56) References Cited

U.S. PATENT DOCUMENTS

| | | | |
|---|---|---|---|
| 6,738,811 B1* | 5/2004 | Liang | 709/224 |
| 6,748,436 B1* | 6/2004 | Anand et al. | 709/226 |
| 6,862,623 B1* | 3/2005 | Odhner et al. | 709/226 |
| 7,007,084 B1* | 2/2006 | Chakravarti et al. | 709/224 |
| 7,225,250 B1* | 5/2007 | Harrop | 709/224 |
| 7,418,478 B1* | 8/2008 | Orling et al. | 709/207 |
| 7,433,942 B2* | 10/2008 | Butt et al. | 709/223 |
| 7,451,210 B2* | 11/2008 | Gupta et al. | 709/224 |
| 7,464,378 B1* | 12/2008 | Limaye et al. | 718/100 |
| 7,562,143 B2* | 7/2009 | Fellenstein et al. | 709/226 |
| 7,680,905 B1* | 3/2010 | Roberts et al. | 709/220 |
| 7,707,285 B2* | 4/2010 | Marvasti | 709/224 |
| 7,895,323 B2* | 2/2011 | Gupta et al. | 709/224 |
| 7,958,396 B2* | 6/2011 | Chitsaz et al. | 714/31 |
| 8,230,259 B2* | 7/2012 | Fernandess et al. | 714/20 |
| 8,266,279 B2* | 9/2012 | Marvasti | 709/224 |
| 8,291,108 B2* | 10/2012 | Raja et al. | 709/238 |
| 8,386,854 B2* | 2/2013 | Fernandess et al. | 714/47.1 |
| 8,479,215 B2* | 7/2013 | Lakshmanan et al. | 718/105 |
| 8,479,216 B2* | 7/2013 | Lakshmanan et al. | 718/105 |
| 8,832,268 B1* | 9/2014 | Chheda et al. | 709/224 |
| 2002/0019870 A1* | 2/2002 | Chirashnya et al. | 709/224 |
| 2002/0174217 A1* | 11/2002 | Anderson | 709/224 |
| 2003/0023719 A1* | 1/2003 | Castelli et al. | 709/224 |
| 2004/0088140 A1* | 5/2004 | O'Konski et al. | 702/183 |
| 2004/0122950 A1* | 6/2004 | Morgan et al. | 709/226 |
| 2005/0165925 A1* | 7/2005 | Dan et al. | 709/224 |
| 2005/0193113 A1* | 9/2005 | Kokusho et al. | 709/225 |
| 2006/0026179 A1* | 2/2006 | Brown et al. | 707/100 |
| 2006/0026599 A1* | 2/2006 | Herington et al. | 718/105 |
| 2007/0067296 A1* | 3/2007 | Malloy et al. | 707/8 |
| 2007/0234366 A1* | 10/2007 | Morich et al. | 718/104 |
| 2008/0059972 A1* | 3/2008 | Ding et al. | 718/105 |
| 2008/0115014 A1* | 5/2008 | Vaidyanathan et al. | 714/42 |
| 2008/0168228 A1* | 7/2008 | Carr et al. | 711/117 |
| 2008/0225710 A1* | 9/2008 | Raja et al. | 370/230.1 |
| 2008/0225718 A1* | 9/2008 | Raja et al. | 370/235 |
| 2009/0070628 A1* | 3/2009 | Gupta et al. | 714/26 |
| 2009/0259749 A1* | 10/2009 | Barrett et al. | 709/224 |
| 2010/0306374 A1* | 12/2010 | Yacoby et al. | 709/224 |
| 2011/0016214 A1* | 1/2011 | Jackson | 709/226 |
| 2011/0145795 A1* | 6/2011 | Khanapurkar et al. | 717/126 |
| 2011/0231899 A1* | 9/2011 | Pulier et al. | 726/1 |
| 2011/0295999 A1* | 12/2011 | Ferris et al. | 709/224 |
| 2012/0030154 A1* | 2/2012 | Nicholson et al. | 706/12 |
| 2012/0047346 A1* | 2/2012 | Kawaguchi | 711/165 |
| 2012/0185913 A1* | 7/2012 | Martinez et al. | 726/1 |
| 2012/0233328 A1* | 9/2012 | Iyoob et al. | 709/226 |
| 2012/0272237 A1* | 10/2012 | Baron | 718/1 |
| 2012/0317249 A1* | 12/2012 | Salsburg et al. | 709/220 |
| 2012/0330971 A1* | 12/2012 | Thomas et al. | 707/748 |
| 2013/0042005 A1* | 2/2013 | Boss et al. | 709/226 |
| 2013/0074181 A1* | 3/2013 | Singh | 726/22 |
| 2013/0138419 A1* | 5/2013 | Lopez et al. | 703/21 |
| 2014/0229610 A1* | 8/2014 | Shen et al. | 709/224 |

OTHER PUBLICATIONS

International Search Report dated Jan. 4, 2010 issued in International Application No. PCT/GB2009/051449.

International Preliminary Report on Patentability dated Feb. 15, 2011 issued in International Application No. PCT/GB2009/051449.

Lee et al.: "A prediction-based adaptive location policy for distributed load balancing" Journal of Systems Architecture, Elsevier Science Publishers BV., Amsterdam, NL, vol. 42, No. 1, Jan. 1, 1996, pp. 1-18, XP005464887; ISSN: 1383-7621, p. 1, line 1—p. 9, right-hand column, line 9.

* cited by examiner

CAPACITY CONTROL

This application is a national phase application under §371 of, and claims priority to PCT/GB2009/051449, filed Oct. 28, 2009, which in turn claims priority to European Patent Application No. 08253584.0, filed Oct. 31, 2008, the entire contents of both applications are expressly incorporated herein by reference.

FIELD

The present invention relates to capacity control and in particular, but not exclusively, to control of one or more processing resources to prevent a maximum resource capacity from being exceeded.

BACKGROUND

Within data processing systems, it is commonly required to manage the physical elements that provide data processing services of some form to monitor the performance of the system and/or to spot errors or failures in the system and/or to provide efficient behaviour of the system.

The present invention has been conceived in the light of known drawbacks of existing systems.

SUMMARY

Viewed from a first aspect, the present invention can provide a method for controlling a resource. The method can comprise collecting operation data from each of a plurality of network resources, wherein different ones of the network resources are operable under different management systems and wherein the operation data is independent of the management system of the network resource to which the operation data relates. The method can further comprise predicting, using the operation data, a future loading on at least one of the network resources, wherein the predicting includes using operation data collected over time to provide an operation data history. The method can also comprise determining, using the predicted future loading, whether a corrective action is required and determining, if a corrective action is required, a corrective action for at least one of the plurality of processing resources. The method can also comprise applying the corrective action to the network resource. Accordingly an automated control for disparate network resources from differing manufacturers or product lines can be implemented by using past behaviour of and/or loading upon network resources to predict a future behaviour so as to be able to pro-actively manage the network resources to avoid an overload or other live issue from occurring.

In some embodiments, the network resources can include a plurality of processing resources and different ones of the processing resources can be operable under different file management systems. Thereby a variety of different processing systems such as servers from a variety of different manufacturers and/or operating under different control or management software can be managed in a collective manner.

In some embodiments, different ones of the plurality of network resources can operate using different operating systems, and the operation data can be independent of the operating system of the network resource to which the operation data relates. Thereby a variety of different network resources such as servers, switches and routers from a variety of different manufacturers and/or operating under different operating software can be managed in a collective manner.

In some embodiments, the corrective action can include at least one action selected from the group comprising: archival of data, compression of data, deletion of data, provision of additional resource, suppression of a service, and allocation of underused active resource to backup/idle. Thereby a variety of corrective actions can be automatically applied. In some examples, some corrective actions can be made as available for automated application, and other corrective actions can be reserved for use by a human administrator.

In some embodiments, the provision of additional resource can comprise one or more of reallocation of resource from one service to a different service, and activation of backup/idle resource. Thereby available resource can be effectively managed to provide improved overall efficiency of resource utilisation.

In some embodiments, suppression of a service can comprise selecting a relatively low priority service and suppressing availability of that service to enable resource to be reallocated to a relatively higher priority service. Thereby high priority applications or services can be maintained as available even when a resource shortage occurs.

In some embodiments, the predicting can use a trending process to identify resource usage trends. In some examples, the trending process uses a linear regression or time series analysis to identify resource usage trends. In some examples the time series analysis can comprise double exponential smoothing or triple exponential smoothing. Thus the prediction can be carried out using an appropriate approach depending upon available processing resource to carry out the prediction and the nature of the data to be predicted.

In some embodiments, the predicting can comprise using a mean squared difference to indicate an accuracy measure for the predicted future loading. Thus the accuracy of the prediction can be measured in a meaningful way to indicate when the prediction is sufficiently accurate to base the automated control upon.

In some embodiments, the predicting can use model descriptors derived from a previous iteration, adjust the model descriptors based upon the latest data in the collection window and store the updated model descriptors for use in a future iteration. This provides that the optimisation of model parameters is made efficient and as computationally straightforward as possible by relying upon previous optimisation effort to monitor and match the model to real data from iteration to iteration.

In some embodiments, the method can also comprise making at least one of the operation data history and the predicted future loading available to an administrator. Thereby the automated process can be monitored by an administrator to enable human intervention in complex situations or situations outside the remit of the automatic control loop.

In some embodiments, the operation data history can include one data point for each measured metric to represent a given time period. In some examples, the data point can be selected from a plurality of values for the metric collected during the time period, or can be an average value of a plurality of values for the metric during the time period. In some examples the operation data history can include data collected over a period of between 1 and 4 months. Thus the data used to generate the model upon which the predicting is based can be selected so as to represent a large number of time periods using a minimum amount of data. Also, the data can be selected to as to represent a worst case scenario for each time period under consideration. The data can be collected over a long period of time so as to provide for a large amount of prior trend to be taken into account in the prediction.

In some embodiments, the determining can also use an accuracy measure for the predicted future loading to determine whether a corrective action can be applied based upon the predicted future loading. Thus the method can limit the automated application of corrective action to situations where a sufficient level of confidence can be placed in the prediction.

Viewed from another aspect, the present invention can provide a system operable to control a resource. The system can comprising a historical data store operable to store an operation data history comprising operation data collected from each of a plurality of network resources, wherein different ones of the network resources are operable under different management systems, and wherein the operation data is independent of the management system of the network resource to which the operation data relates. The system can also provide a predictor operable to predict, using the operation data in the operation data history, a future loading on at least one of the network resources, and a determiner operable to determine, using the predicted future loading, whether a corrective action is required, and to determine, if a corrective action is required, a corrective action for at least one of the plurality of processing resources. The system can further comprise an instruction generator operable to generate an instruction to cause the corrective action to be applied to the network resource. Accordingly an automated control for disparate network resources from differing manufacturers or product lines can be implemented by using past behaviour of and/or loading upon network resources to predict a future behaviour so as to be able to pro-actively manage the network resources to avoid an overload or other live issue from occurring.

Viewed from another aspect, the present invention can provide a computer program comprising computer implementable instructions to cause a programmable computer to become configured as the system described above or to cause one or more programmable computers to carry out the methods described above. The computer program can be embodied on a storage medium or a carrier medium. A storage medium can include a persistent or non-persistent memory of a computer device or system. A carrier medium can include a portable memory or storage device or a transmission medium. In the case of the carrier medium being a transmission medium, the program may be embodied within a signal passing through or over the transmission medium.

Viewed from a further aspect, the present invention can provide a system, apparatus and/or method according to which collected history data from monitorable and/or manageable entities within a server estate or data centre is used to tailor a model to the past behaviour and/or loading upon individual ones or parts of ones of the entities. The tailored model can then be used to predict a future value for one or more metrics included in the history data for an entity or part of an entity under consideration. The predicted value can then be used to determine whether some form of corrective action is required in respect of the entity, entity part or some other entity or entity part. Alternatively or in addition, predicted values for more than one entity or entity part can be aggregated to determine whether some form of corrective action is required in respect of the entity, entity part or some other entity or entity part. A corrective action can be applied on an automated or on a manual basis.

In some examples, parameters which describe the tailoring of the model for a particular entity or entity part can be saved for future iterations in respect of the same entity or entity part. Thus the efficiency of tailoring of the model to a particular history for a given entity or entity part can be improved by relying on previous parameter values as a starting point in a next iteration.

Viewed from a further aspect, the present invention can provide a system, apparatus and/or method according to which collected history data from monitorable and/or manageable entities within a server estate or data centre is used to tailor a model to the past behaviour and/or loading upon individual ones or parts of ones of the entities. The tailored model can then be used to predict a future value for one or more metrics included in the history data for an entity or part of an entity under consideration. Both or either of the historical data and the predicted value can be presented to an administrator in the manner of a league table or other visual representation, whereby an administrator can monitor and control the server estate or data centre based upon data in respect of and predictions in respect of which elements or entities within the server estate or data centre are most in need of attention. The historical data and/or the predicted values for individual entities or parts of entities can be aggregated to provide presented information on the basis of per entity or per groups of entities.

In some examples, the predicted value can be used to determine whether some form of corrective action is required in respect of the entity, entity part or some other entity or entity part. Alternatively or in addition, predicted values for more than one entity or entity part can be aggregated to determine whether some form of corrective action is required in respect of the entity, entity part or some other entity or entity part. A corrective action can be applied on an automated or on a manual basis.

Further objects and advantages of the invention will become apparent from the following description and the appended claims.

BRIEF DESCRIPTION OF THE DRAWINGS

For a better understanding of the invention and to show how the same may be carried into effect reference is now made by way of example to the accompanying drawings in which.

Figure 1:
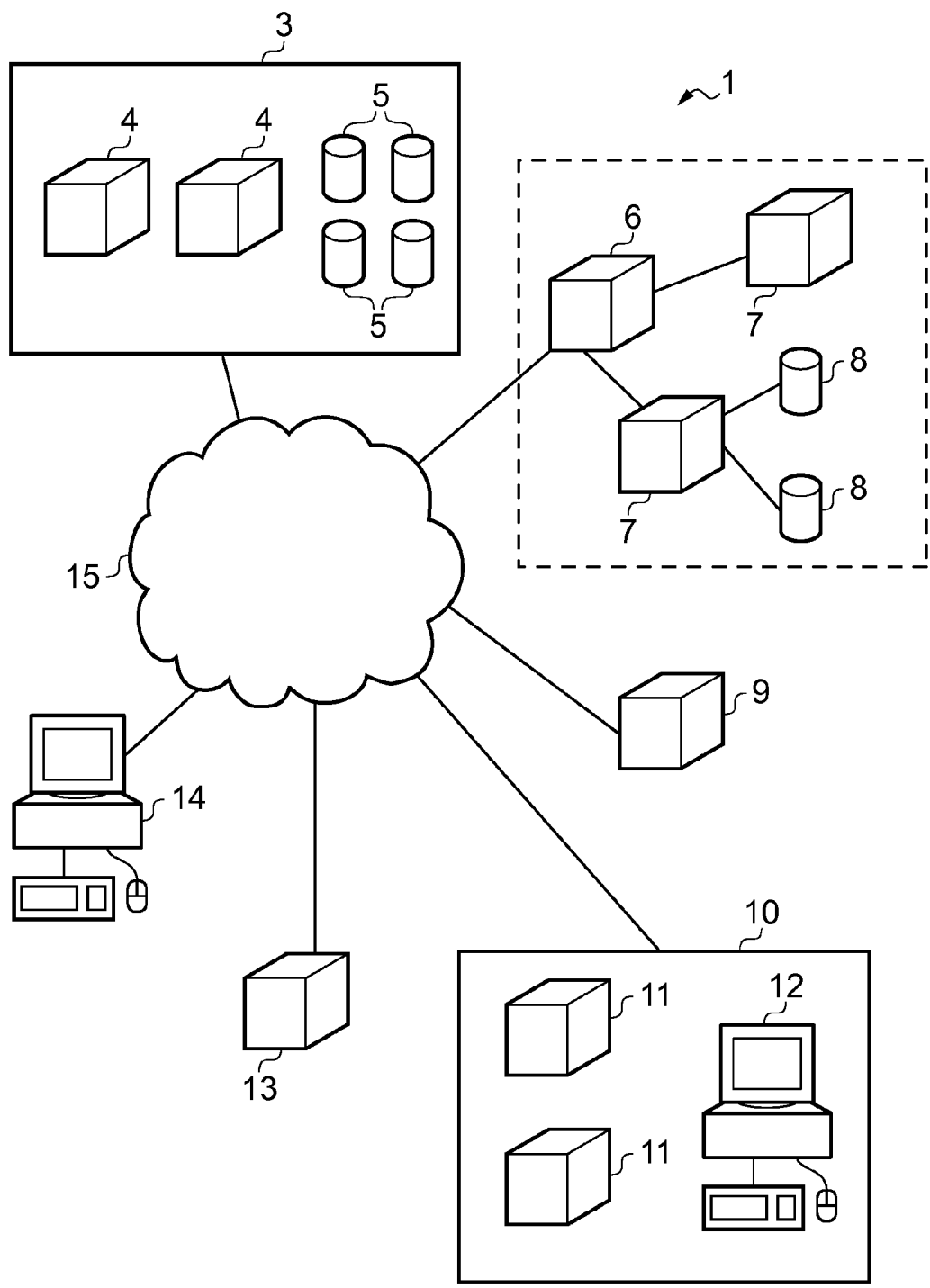
FIG. 1 shows a schematic representation of a networked computer environment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

As is shown schematically in FIG. 1, a networked computer environment can include a large number of different elements. These elements can be divided, from a certain point of view, into three main categories: fabric, server estate and client estate. The fabric is the interconnect that supports the server estate and client estate into a networked configuration, and may include, for example communications channels such as electrically wired links, optically wired links and wireless channels, and switching apparatus such as switches, routers and domain controllers. A fabric may in fact be a number of connected fabrics, such as two private networks connected via a public network such as the internet. The fabric is generically illustrated as network 15 within FIG. 1. The server estate can include, for example, one or more of accumulated resources such as a data centre 3 (which may individually comprise servers 4 and/or dedicated storage resources 5), other connected networks which may include gateway or firewall servers 6, servers 7 and/or dedicated storage resources 8), or individual servers 9. The client estate can include, for example, clients connected via a connected network 10 (which may itself include clients in the form of client servers 11 or terminals 12), client servers 13 or client terminals 14.

Such a networked computer environment is central to a large number of computer based systems. For example, a financial services organisation may utilise a number of large data centres to provide high availability, secure and resilient access to transaction processing services which can be accessed by a variety of clients for a variety of purposes. One type of client could be an individual account holder's terminal (which may be part of a private network or directly connected to the internet) which accesses the bank systems for data retrieval (such downloading of statements) and conducting transactions (such as electronic funds transfers). Another type of client could be associated with an automated teller machine (or "cash machine") which provides transaction services (such as cash and cheque deposit, cash withdrawal, and electronic funds transfer) to users. Another type of client could be a terminal for use by bank employees at a call centre or other bank facility in dealing with customers, this type of terminal could have access to, for example, credit scoring data, account holder private data, or product data in addition to transaction related data.

For an organisation which requires a high availability, secure and resilient system in order to conduct its business (such as a financial services organisation, a public utility organisation or a travel booking organisation), the ability to predict a capacity shortage within its data centres can be very important. Providing the ability to run a data centre at close to, but never reaching, 100% capacity allows an organisation to achieve maximum processing performance per unit expenditure on processing infrastructure. This also allows the organisation to avoid incurring high energy charges and causing the associated additional drain on power supply facilities in relation to running a larger number of computers than is necessary to achieve a required level of computing performance.

However, in order to provide a data centre type facility which can run reliably at close to, but never reaching, 100% capacity is a non-trivial undertaking. Load on a computer system can vary on a temporal basis in dependence upon, for example, time of day, day of the week, week of the month and month of the year. Variations can also be caused by factors such as marketing promotions and by financial market conditions. Taking all of these factors into account is a difficult and time-consuming process. The drawbacks of failing to manage the resources to match the demand correctly are that, either more resource capacity is provided than is needed which wastes money, and causes increased energy consumption and causes resource equipment lifetime to be negatively affected, or on the other hand users receive a reduced or completely failed service due to a lack of resource capacity to handle user requests. As can be seen, both such outcomes are undesirable.

Therefore, with reference to FIG. 2, there will now be described a system and method that can be used to manage a resource providing computer system or systems in order to maximise resource usage without an incidence of under-provision of resource.

Figure 2:
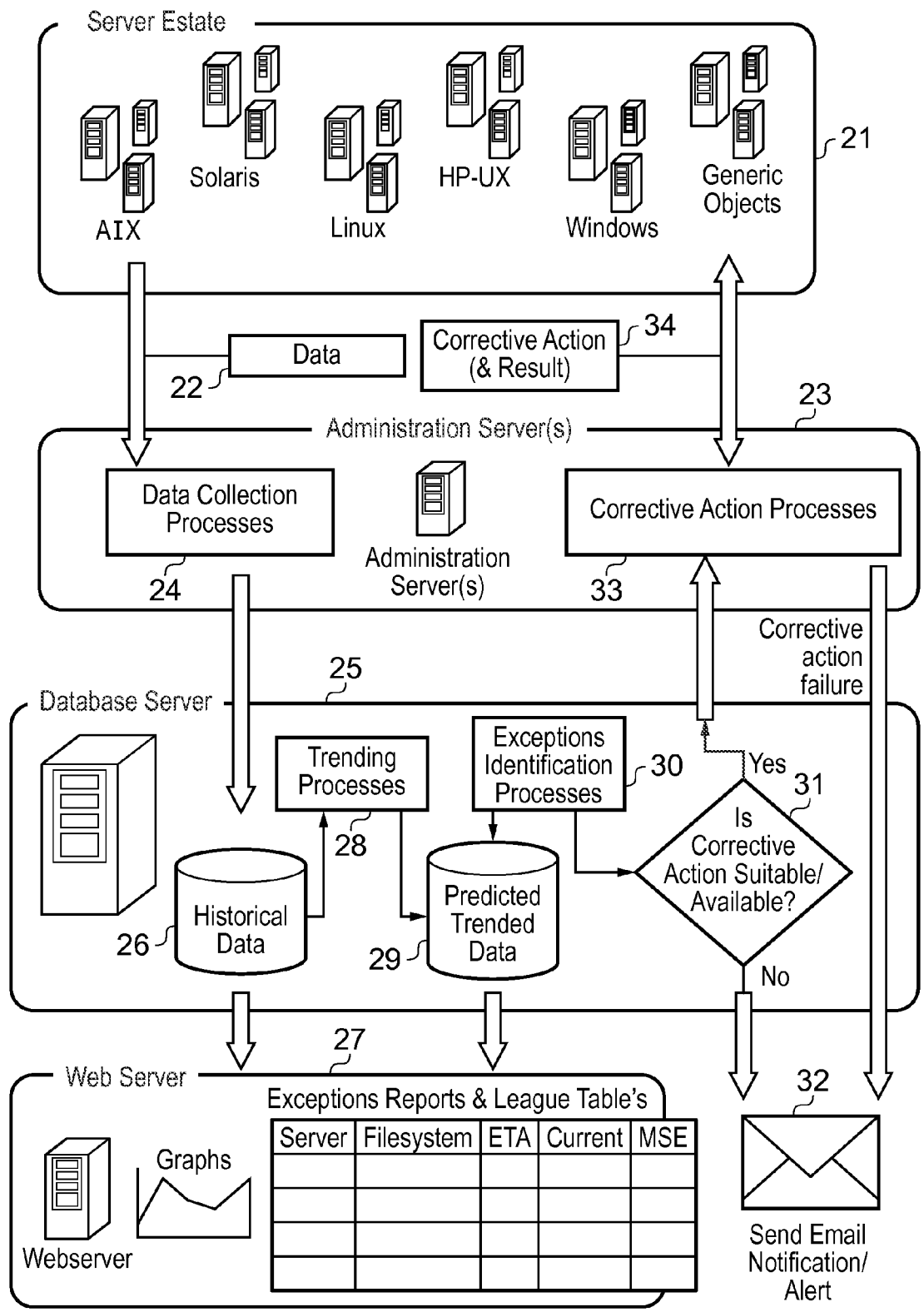
FIG. 2 shows a schematic representation of a system for controlling resource management within server estate elements shown in FIG. 1.

As is shown in FIG. 2, a body of server estate 21 can include a number of different server estate elements including server computers, which server computers may operate using one or more operating systems. Examples of operating systems which may be employed include Unix™, AIX™, Solaris™, Linux™, HP-UX™, and Windows™. Additionally, different versions of a given operating system may be employed. Also, the server estate may include generic objects such as network switches, storage elements, etc. These can include any resource with reportable capacity or performance metrics that are not servers but are an integral part of running a data centre. As will be appreciated, different server operating systems and operating system versions may use different file storage formats, technologies and protocols. The present example advantageously allows a server estate which includes servers having different file storage regimes to be managed together for maximum efficiency of the overall server estate.

In the arrangements of the present example, data 22 describing the performance, configuration and/or condition of the servers in the server estate 21 is collected within one or more administration servers 23 by one or more data collection processes 24. This process includes transforming the collected data into a single format, which accurately represents the data from all of the different server systems in a common format. The data collection can be performed using a field ripping program or parser that collects raw data from a server/SAN/generic object's native format into a common data collocation format. This program or parser has knowledge of the different formats used by the different elements in the server estate 21 and presents the extracted data in a single known format to the rest of the system. Accordingly, there is no need for the rest of the system to have knowledge of the specific data reporting formats of the different server estate elements.

The collected and formatted data is then transferred to a database server 25 which is tasked with managing and using the collected data. The database server 25 includes a store of historical data 26, into which newly received data from the data collection process 24 is stored. The store of historical data 26 provides a record of the performance, configuration and/or condition of the server estate 21 over a period of time.

The data stored as historical data 26 may be all of or less than all of the data collected. For example, a snapshot data collection may occur every 1 hour, but only one value be stored to the historical data per day. The data to be stored could be selected on the basis of, for example the data from the time when the surveyed server system had its highest utilised (i.e. lowest free) capacity during the recording period. Alternatively, an average of all values taken over the recording period in question could be used.

Using the historical data from the historical data store 26, trends within the data can be identified by trending processes 28 which produce trended/predicted data 29. The trending processes will be described in greater detail with reference to FIG. 4 below.

Both the historical data and the predicted/trended data can be exported to or accessed by reporting tools, which may be operable through a webserver 27. These reporting tools enable the various data to be analysed and/or viewed in the form of, for example, graphs and/or tables. This can be used for real-time monitoring of the server estate by a human operator and/or for after the event reporting on the historical condition of the server estate.

The predicted data can be analysed and compared with defined thresholds/limits for the data by exception identification processes 30 in order to assess whether further action needs to be taken and/or if some form of alert or notification needs to be generated. Also, additional comparisons can be made on relative accuracy indicators included within the predicted data in order to assess whether there is sufficient confidence in the data to carry out an automated action.

In a circumstance in which an action is deemed to be necessary in response to the predicted data, a decision making process 31 can determine whether an automated corrective action to address the situation is suitable and/or available. This decision may be based upon an outcome from the exception identification processes 30 and/or upon a range of automated corrective actions which are available, and/or upon a range of corrective actions which are not available for automated implementation. For example, if an outcome from the exception identification processes 30 indicates that additional storage capacity is required within a certain server type or group within the server estate the decision making process 31 may determine that all available automated corrective actions (such as activating backup server capacity, or archiving or older data) are insufficient to meet the required need, then a notification or alert 32 may be sent to a higher administration authority which may be a further automated process or a human operator. This notification or alert may be sent by email or any other suitable message channel. Examples of a situation where an automated corrective action might not be available may include a situation where insufficient capacity can be made available to meet the predicted need so there may be a need to deliberately curtail availability of a selected service or services in order to avoid error occurring in critical services, or a situation where the decision making process is unable to map available automated corrective actions to the situation described in the predicted data such that manual input is required to find a solution.

On the other hand, if the decision making process 31 concludes that one or more automated corrective actions are both suitable and available to address the situation described in the predicted data and identified by the exception identification processes 30, then instructions and parameters for the automated corrective action(s) are provided to administration server(s) 23 where corrective action processes 33 attempt to implement the required actions. The result of the attempted corrective action 34 is fed back to the administrative server 23 from the server(s) within the server estate 21 upon which the action was attempted. If the corrective action was successfully completed, this can be reported directly (although this is not necessary since this will be reflected in the data 22 collected by the data collection process 24 in future data collection actions). If the corrective action was not completed successfully, this is reported by the corrective action processes 33. In the present example, this takes the form of a direct notification or alert 32 to a higher administration authority which may be a further automated process or a human operator. This notification or alert may be sent by email or any other suitable message channel.

It will therefore be understood from the foregoing how a server estate can be managed automatically to provide sufficient resource for services provided from that server estate without wastefully over-providing resource or harmfully under-providing resource.

Examples of corrective actions which such a system can take to implement such resource management can include the following:
  archival of data;
  compression of data;
  deletion of data;
  reallocation of resource from one service to a different service;
  activation of backup/idle resource;
  allocation of underused active resource to backup/idle; and
  suppression of a service.

Suppression of a service may include deliberate suspension or reduction of available resource to a particular, usually lower priority, service to ensure that adequate resource can be applied to another, usually higher priority, service.

Figure 3:
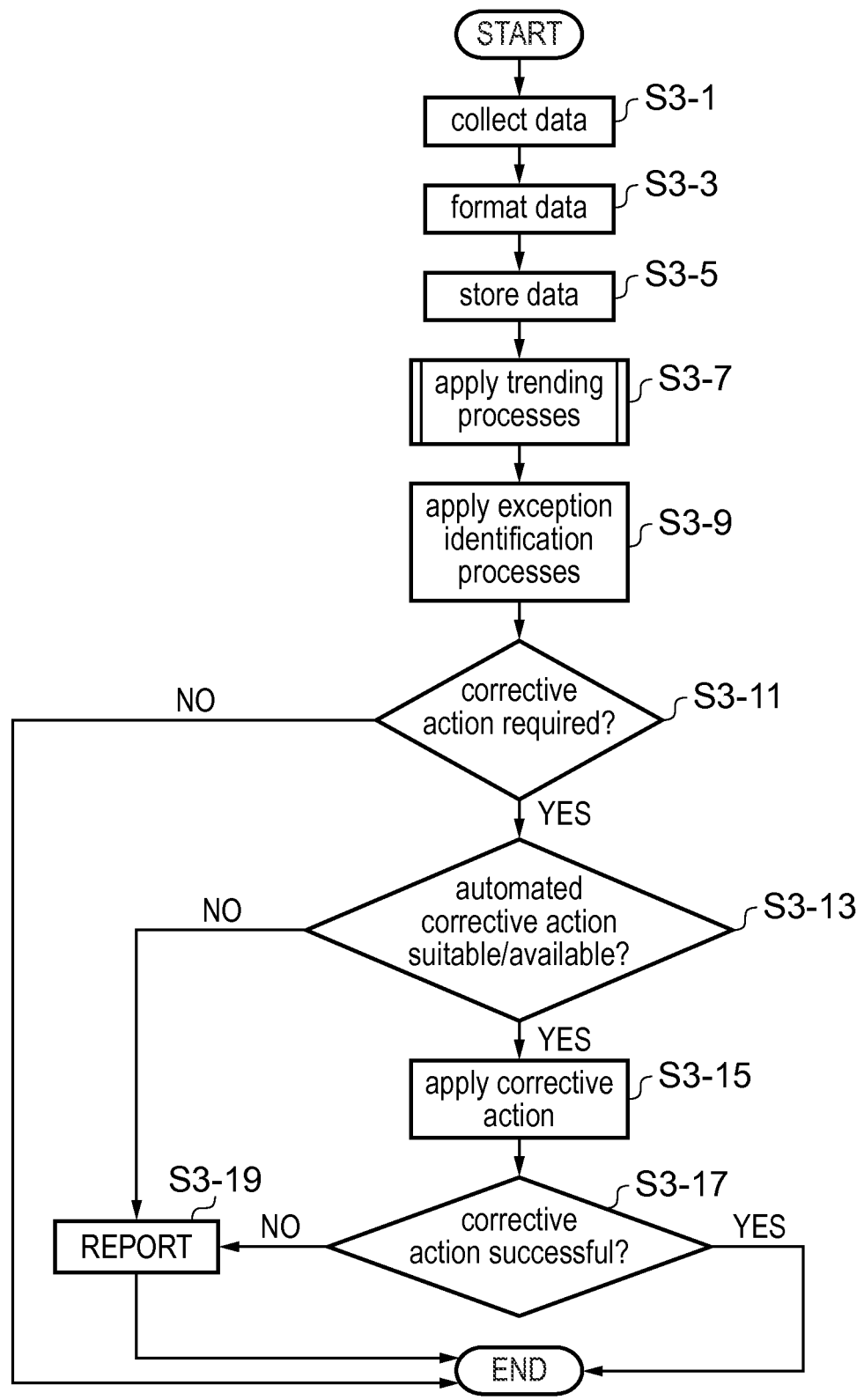
FIG. 3 shows a flow chart illustrating steps involved in using the resource management system shown in FIG. 2.

To further aid the understanding of the skilled reader, FIG. 3 depicts a flowchart illustrating certain steps within the server estate management process described above.

Starting at step S3-1, the data is collected from the server estate. This data is then formatted into the universal format that is applicable to data from all servers in the server estate at step S3-3. This data is then stored at step S3-5. As noted above, the collection may record more data than is actually stored for use in the later trending process.

At step S3-7, the stored data is used by trending processes that produce predicted data which describes predicted behaviour in respect of the server estate. The predicted data is then subjected to exception identification processes at step S3-9 to identify any predicted data that indicates a need for corrective action and optionally provides an indication of confidence in any such prediction.

Thus, at step S3-11, a decision is taken as to whether any corrective action is currently required. If the answer is no, then the process ends. If the answer is yes, then at step S3-13 a decision is taken as to whether an automated corrective action is suitable/available for the predicted situation. If so, then at step S3-15 a corrective action is applied and the success of the corrective action is reported. If it is found at step S3-17 that the corrective action completed successfully, then the process ends.

If, on the other had it was determined at step S3-13 that no automated corrective action is suitable/available, or if is determined at step S3-17 that an applied corrective action did not complete successfully, then this is reported at step S3-19 before the process ends.

It will be appreciated that in most circumstances, this process will be carried out multiple times. Depending on the nature of the services being provided and the server estate which provides the resource to the services, the behaviour prediction and correction application method illustrated in FIG. 3 may be carried out on different frequencies. In some examples, the process may be carried out multiple times per hour, and in other examples the process may be carried out as infrequently as once per week or once per fortnight. In the present example, the process is carried out at least once per day.

Thus, it will now be understood how an automated application of corrective action can be made for a server estate that provides one or more services based upon prediction of the demands upon that server estate.

Now, with reference to FIG. 4, the various elements involved in the trending processes briefly described above will be described in more detail.

Figure 4:
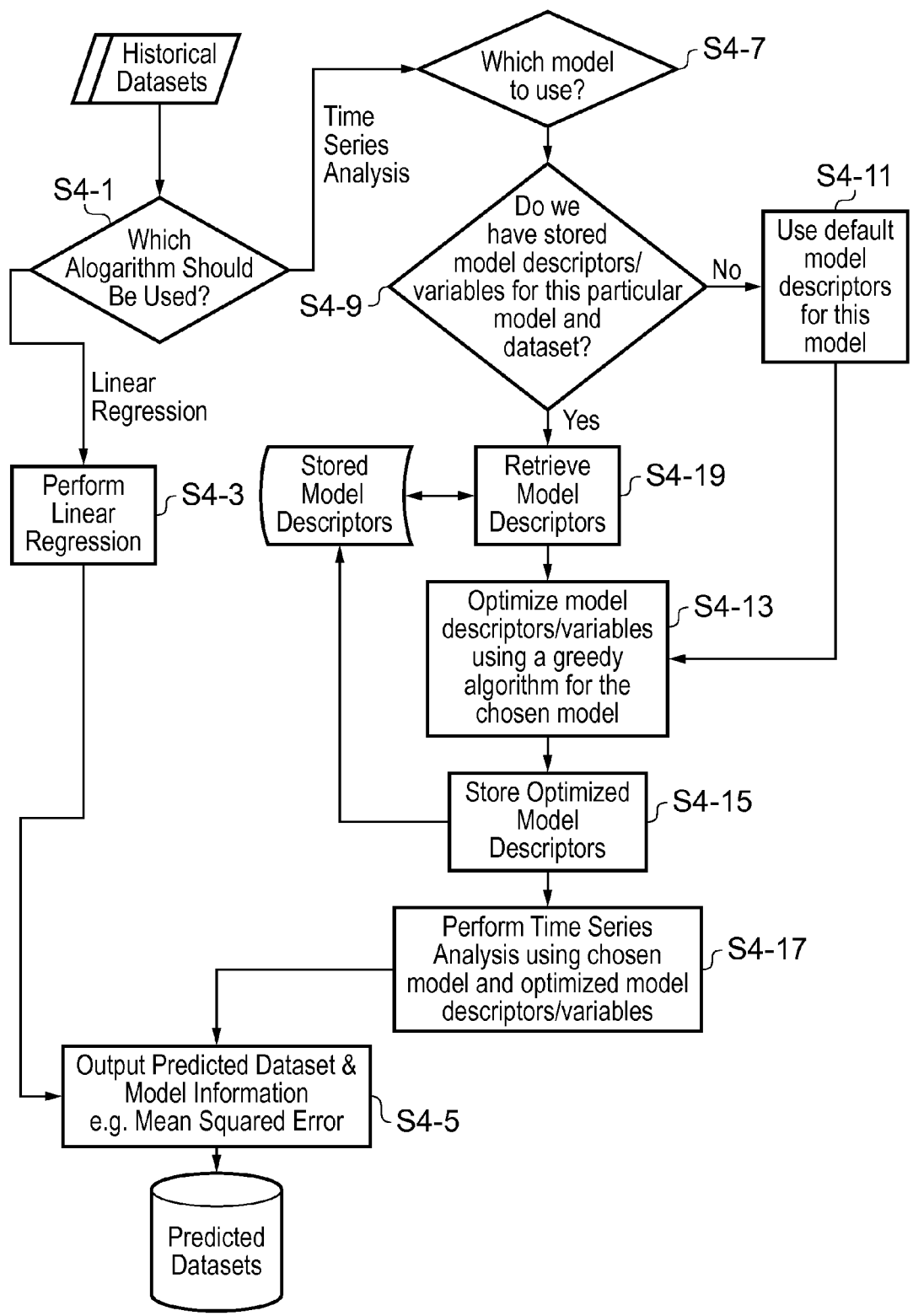
FIG. 4 shows a flow chart illustrating steps involved in the trending process shown in FIG. 3.

FIG. 4 illustrates the steps that make up the step of applying the trending processes at S3-7 of FIG. 3. This process acts upon the historical data stored in the historical data store 26. In the present example, the trending process uses the historical data over a rolling window. The rolling window can be of any suitable time length. For the present examples, a typical value might be in the range of 1 to 4 months, for example 60 days or 3 months.

Starting at step S4-1, the process first determines which trending algorithm should be used. In the present examples, the available options are a linear regression and a time series analysis such as double or triple exponential smoothing. The decision as to whether linear regression or time series analysis should be chosen is based upon factors such as expected data behaviour. For example, if the data is expected to be generally linear a linear regression would be selected as this is a relatively crude approach, but fits well to data that is generally linear in nature and is computationally straightforward. Examples of suitable data types for a linear regression include filesystems and disk space utilisation as these tend to be linear. A time series analysis is a more accurate modelling technique but is computationally more burdensome than linear regression. Examples of data particularly suited to a time series analysis are those which are expected to be highly non-linear such as CPU utilisation. Linear data can be modelled using a time series analysis and this may result in a greater accuracy in the model than use of linear regression, but has the disadvantage of the greater computation resource required.

The present example performs the modelling at a fine level of granularity in terms of server estate elements. Thus the process in FIG. 4 is performed for each data set that is to be considered and the results for the different data sets can be aggregated as required to provide information on a particular data set, a particular server estate element, a particular group of server estate elements, or the whole server estate. The data sets can thus be constructed to refer to a lowest level of reportable element. A data set could therefore, for example, relate to an individual disc (logical or physical) or processor core of a single server so that the data describing a particular server or other server estate element can be made up of multiple data sets.

If linear regression is to be performed, processing continues at step S4-3 where the linear regression is conducted before the predicted dataset and any associated metadata are output at step S4-5 and can include a number of elements. The predicted dataset contains predicted future values for at least one of the parameters of the data collected about one of the server systems in the server estate (the predicted metric). The associated metadata may include an indication as to which system (dataset) the prediction relates.

The linear regression used in the present example applies the well-known technique of linear regression to the historical data in order to create the predicted data. The model applied in the present example is:

$$\hat{Y}=\hat{\alpha}+\hat{\beta}x \qquad (1)$$

Where:
$\hat{Y}$ is the predicted value of the dataset. It is the 'line of best fit' that minimises the MSE (mean squared error);
x represents time elapsed since the first observation of the dataset;
$\hat{\alpha}$ is a calculated value where:

$$\hat{\alpha}=\bar{y}-\bar{x}\hat{\beta} \qquad (2)$$

and
$\hat{\beta}$ is also a calculated value where:

$$\hat{\beta}=\frac{\sum(x_i-\bar{x})(y_i-\bar{y})}{\sum(x_i-\bar{x})^2} \qquad (3)$$

As will be understood, this approach is a relatively straightforward from a computational effort perspective. The output is the predicted line $\hat{Y}$ which provides a predicted value for the parameter being considered in the dataset (e.g. disk space utilisation for a particular logical of physical disk or array) at a given time point x.

If, on the other hand it is determined at step S4-1 that time series analysis is to be performed, the next step is at optional step S4-7 to determine which of a number of time series analyses is to be used. This step may be omitted if only one time series analysis method is available and/or it may be combined with step S4-1.

Once a time series analysis model has been selected (if necessary), processing continues at step S4-9 when a check is performed to determine whether the dataset under consideration has any stored model descriptors. If not, which will occur on the first processing by this method of a given dataset, then at step S4-11 a set of default model descriptors are selected. Each server estate can have a number of datasets which need to be individually modelled using different model descriptors. Each different dataset is essentially a different combination of the available variables within the historic data. It will be appreciated that some theoretically possible datasets may be uninteresting, so it is likely that some of the potential datsets are not modelled by the systems of the present examples.

These model descriptors are then optimised using a greedy algorithm at Step S4-13. As will become apparent, the option of double exponential smoothing carried out in the present example (described below) uses two parameters, each of which is a real number having a value in the range 0≤value≤1. For this situation a suitable greedy algorithm is as follows.

For each parameter in the model descriptors (identified as "α" and "γ" herein for ease of reference), a small variations ε tried and evaluated in the following manner: (α, γ), (α +ε, γ), (α −ε, γ), (α, γ +ε), (α, γ −ε). Each of these models is evaluated against the historical data to determine the accuracy of the model and the model deemed most accurate is selected. Using this selected model as the starting point the same evaluation is carried out using the variation ε until no further improvement can be obtained. The process can then be repeated using a smaller value for ε until no further improvement can be obtained. This optimised model will serve as the basis for the double exponential smoothing.

The greedy algorithm is adapted according to the time series analysis actually used. For example, if the time series analysis is a triple exponential smoothing, then there are parameters α, γ, β.

During the performance of the greedy algorithm, the accuracy of each model is determined to evaluate which should be selected. In the present examples, this is carried out using an analysis to find the mean squared error for each of the candidate models. This is calculated using the differences between the known values and those predicted by the model for the time period corresponding to the known values. This is evaluated by using the model parameters to work the model in respect of historical data and comparing the historical data predicted thereby to the actual historical data.

Once the optimum model descriptors have been identified by the greedy algorithm, these are stored at step S4-15 for use in future iterations of the trending process. This avoids the need to carry out the computationally intensive greedy algorithm in full from the essentially arbitrary default model descriptors With the model descriptors determined, the time series analysis occurs at step S4-17 before the predicted dataset and any associated metadata are output at step S4-5.

For future iterations of the trending process, the stored model descriptors are retrieved at step S4-19 instead of default model descriptors being retrieved at step S4-9.

As noted above, the options for the time series analysis include double and triple exponential smoothing. Other possibilities include single exponential smoothing, moving average models, univariate time series models, or multivariate time series models. The following examples concentrate on double and triple exponential smoothing approaches.

The double exponential smoothing used in the present example operates as follows. The smoothed value $S_t$ of the dataset at time t is as follows:

$$S_t = \alpha y_t + (1-\alpha)(s_{t-1} + b_{t-1}) \quad (4)$$

where: $0 \leq \alpha \leq 0$
and the trend $b_t$ at time t is:

$$b_t = \gamma(S_t - S_{t-1}) + (1-\gamma)b_{t-1} \quad (5)$$

where: $0 \leq \gamma \leq 0$ $\alpha, \gamma$ are the parameters optimised by the greedy algorithm at step S4-11 to minimise the mean squared error and which, once optimised, cause the model to provide a usable prediction of the future behaviour. To provide an approximate meaning for these parameters, $\alpha$ represents a 'Demand parameter' and $\gamma$ represents a 'Trend parameter'. These are essentially weightings which range between 0 and 1 in value to determine the relative weight in the result accorded to different age data.

Initial values for the smoothed value and trend value ($S_1$ & $b_1$) are calculated from the dataset.

As will be understood from the above, equation (4) adjusts $S_t$ directly for the trend of the previous period, $b_{t-1}$, by adding it to the last smoothed value, $S_{t-1}$.

The predicted value/forecast from the double exponential smoothing model, m periods of time into the future from present time t is found using the following equation:

$$F_{t+m} = S_t + mb_t \quad (6)$$

In essence, the modelling process uses equations (4) and (5) to determine smoothed values for all the values in the dataset of historic values. Then using the 'most recent' smoothed value $S_t$ and its corresponding trend value $b_t$, the future values are forecast using equation (6).

As mentioned above, an alternative time series analysis option is triple exponential smoothing. Triple exponential smoothing is one approach to take into account, trend over time (as for double exponential smoothing), with the addition of so-called seasonal variations. The equations which are used in this example are:

$$S_t = \alpha \frac{y_t}{I_{t-L}} + (1-\alpha)(S_{t-1} + b_{t-1}) \quad (7)$$

$$b_t = \gamma(S_t - S_{t-1}) + (1-\gamma)b_{t-1} \quad (8)$$

$$I_t = \beta \frac{y_t}{S_t} + (1-\beta)I_{t-L} \quad (9)$$

And the forecast equation is:

$$F_{t+m} = (S_t + mb_t)I_{t-L+m} \quad (10)$$

Where:
$y_t$ is the observation at time period t
$S_t$ is the smoothed observation at time period t
$b_t$ is the trend factor at time period t
$I_t$ is the seasonal index at time period t
L is the number of time periods in a 'season'
$F_{t+m}$ is the forecast m periods into the future from time period t $\alpha, \beta, \gamma$ are the descriptors/parameters to be optimized by the greedy algorithm at step S4-11 to minimise the mean squared error and which, once optimised, cause the model to provide a usable prediction of the future behaviour. To provide an approximate meaning for these parameters, $\alpha$ represents a 'Demand parameter', $\gamma$ represents a 'Trend parameter', and $\beta$ represents a 'Seasonal parameter'. These are essentially weightings which range between 0 and 1 in value to determine the relative weight in the result accorded to different age data.

Initial values for the smoothed value, trend value and index value ($S_1$, $b_1$ & $I_1$) are calculated from the dataset.

In essence, the modelling process uses equations (7), (8) and (9) to determine smoothed values for all the values in the dataset of historic values. Then using the 'most recent' smoothed value $S_t$, its corresponding trend value $b_t$ and the seasonal index $I_t$, the future values are forecast using equation (10).

As noted above, each data set may relate to one part of a server estate element and so the predicted values for individual data sets may be combined as necessary for the purposes of management of the server estate.

As is clear from the above discussion of the model descriptors $\alpha, \gamma$ (and $\beta$) are computationally expensive to optimise. However the tending process described herein minimises this effort by storing these values for each system/metric dataset.

Given that the 'rolling history' will remain largely unchanged for the next forecast (the previous stored optimum values should be very close to the new optimum values assuming the data fits the model) and therefore less optimisation is required. This enables a large amount of time and/or processing effort to be saved when forecasting across large numbers of systems/metrics.

The predicted dataset and any associated metadata are output step S4-5 can include a number of elements. The primary element is a prediction of a future value of at least one of the parameters of the data collected about one of the server systems in the server estate (the predicted metric). Along with this, there may also be provided an indication of which system (dataset) the prediction relates to, and/or the last recorded value for the metric which has been predicted, and/or an estimated time until a threshold for the metric is breached, and/or an error measure for the predicted metric. The error measure may be a mean squared error based upon the differences between the predicted values for the metric during the period for which data is available and the actual values during that time period.

This output can be collated together across all systems in the server estate. As explained above, this collated data can be displayed. The displaying can take the form of a 'league table', sorted in accordance with a user preference, for example sorted by estimated time remaining to threshold. The mean squared error value gives an idea of the sense of accuracy, with lower values suggesting the model fits the data better. Such a league table can be displayed via a web server and made accessible for human interpretation.

As explained above, the output of the trending process is also used to determine whether any automated corrective action needs to be and/or can be applied. Any such action can be applied as described above.

Although not shown in the figures, there can be provided a system whereby if a linear regression approach fails to produce a result with sufficiently small error measure for the prediction to be relied upon for making behaviour predictions, the methods can abandon the linear regression and start again using a time series analysis model.

The same can apply where a choice of different time series analysis models are available. For example if a double exponential smoothing fails to achieve sufficient accuracy when judged against the historical data, the process can be repeated using triple exponential smoothing.

Thus there has now been described a system and method for predicting the future behaviour of a group of computer systems and applying automated corrective actions based upon the predictions.

It will be appreciated that although particular examples and embodiments of the invention have been described, many modifications/additions and/or substitutions may be made within the scope of the present invention.

The invention claimed is:

1. A computer implemented method for controlling a resource implemented by a computer system, the computer system providing a plurality of different services and the method comprising:
   collecting operation data from each of a plurality of network resources comprising a plurality of computer processing resources, wherein different ones of the network resources operate under different management systems comprising at least one of different computer file management systems and different operating systems, and wherein the operation data is independent of the management system of the network resource to which the operation data relates;
   predicting, by the computer system a future loading on at least one of the network resources using the operation data collected over time to provide an operation data history and model descriptors derived from a previous iteration, adjusting the model descriptors based upon latest data history, and storing the updated model descriptors for a future iteration;
   determining by the computer system, using the predicted future loading, whether a corrective action is required;
   determining by the computer system, when the corrective action is required, a predetermined corrective action for at least one of the plurality of network resources associated with first and second services of said plurality of services;
   reassigning before a failure of the second service, by the computer system, at least one of the network resources from the first service of said plurality of services to the second service of said plurality of services responsive to priority levels associated with the first and second services.

2. The method of claim 1, wherein different ones of the plurality of network resources operate using different operating systems, and wherein the operation data is independent of the operating system of the network resource to which the operation data relates.

3. The method of claim 1, wherein the corrective action includes at least one action selected from the group comprising: archival of data, compression of data, deletion of data, provision of additional resource, suppression of a service, and allocation of underused active resource to backup/idle.

4. The method of claim 3, wherein provision of additional resource comprises one or more of reallocation of resource from one service to a different service, and activation of at least one of a backup and idle resource.

5. The method of claim 3, wherein suppression of a service comprises selecting a lower priority service and suppressing availability of that service to enable resource to be reallocated to a higher priority service.

6. The method of claim 1, wherein the predicting uses a trending process to identify resource usage trends.

7. The method of claim 6, wherein the trending process uses a linear regression or time series analysis to identify resource usage trends.

8. The method of claim 7, wherein the time series analysis comprises double exponential smoothing or triple exponential smoothing.

9. The method of claim 1, wherein the predicting comprises using a mean squared difference to indicate an accuracy measure for the predicted future loading.

10. The method of claim 1, further comprising making at least one of the operation data history and the predicted future loading available to an administrator.

11. The method of claim 1, wherein the operation data history includes one data point for each measured metric to represent a given time period.

12. The method of claim 11, wherein the data point is selected from a plurality of values for the metric collected during the time period, or is an average value of a plurality of values for the metric during the time period.

13. The method of claim 1, wherein the operation data history includes data collected over a period of between 1 and 4 months.

14. The method of claim 1, wherein the determining also uses an accuracy measure for the predicted future loading to determine whether a corrective action can be applied based upon the predicted future loading.

15. The method of claim 1, wherein the priority level associated with the first service is lower than the priority level associated with the second service.

16. A computer architecture configured to control a resource, the computer architecture providing a plurality of different services and comprising:
   at least one computer database storing historical data and configured to store an operation data history comprising operation data collected from each of a plurality of network resources comprising a plurality of computer resources, wherein different ones of the network resources operate under different management systems comprising at least one of different computer file management systems and different operating systems, and wherein the operation data is independent of the management system of the network resource to which the operation data relates;
   a computer system in communication with the at least one computer database, wherein the computer system comprises a processor executing the following components:
   a predictor configured to predict a future loading on at least one of the network resources by using the operation data in the operation data history and model descriptors derived from a previous iteration, adjusting the model descriptors based upon latest data history, and storing the updated model descriptors for a future iteration;
   a determiner configured to determine, using the predicted future loading, whether a corrective action is required, and to determine, when the corrective action is required, a predetermined corrective action for at least one of the plurality of network resources associated with first and second services of said plurality of services;
   an instruction generator configured to reassign, before a failure of the second service, at least one of the network resources from the first service of said plurality of services to the second service of said plurality of services responsive to priority levels associated with the first and second services.

17. A non-transitory computer-readable memory device comprising instructions, that when executed by a computer processor cause a programmable computer to execute the instructions that:

predict, by the computer system, a future loading on at least one of the network resources comprising a plurality of computer processing resources, wherein different ones of the network resources operate under different management systems comprising at least one of different computer file management systems and different operating systems, wherein the predicting includes using operation data collected over time to provide an operation data history and model descriptors derived from a previous iteration, adjusting the model descriptors based upon latest data history, and storing the updated model descriptors for a future iteration;

determine by the computer system, using the predicted future loading, whether a corrective action is required;

determine by the computer system, when the corrective action is required, a predetermined corrective action for at least one of the plurality of network resources associated with first and second services of said plurality of services; reassign before a failure of the second service, by the computer system, at least one of the network resources from the first service of said plurality of services to the second service of said plurality of services responsive to priority levels associated with the first and second services.

18. A computer architecture configured to control a resource, the computer architecture providing a plurality of different services, comprising:

a plurality of network resources comprising a plurality of computer processing resources including a first network resource operating under a first management system comprising at least one of a first computer file management system and a first operating system, and a second network resource operating under a second management system different comprising at least one of a second computer file management system different than the first computer file management system and a second operating system different than the first operating system;

a data collection computer system collecting operation data from each of a plurality of network resources, wherein the operation data is independent of the management system of the network resource to which the operation data relates and includes operation data history;

at least one computer database in communication with and receiving the operation data collected by the data collection computer system, and storing the operation data collected from each of a plurality of network resources;

a computer system in communication with the at least one computer database, wherein the computer system comprises the following components executed by a processor of the computer system:

a predictor configured to predict, by the computer system, a future loading on at least one of the plurality of network resources by using the operation data and model descriptors from a previous iteration, adjusting the model descriptors based upon latest data history, and storing the updated model descriptors for a future iteration;

a determiner configured to determine, by the computer system, using the predicted future loading, whether a corrective action is required, and to determine, when the corrective action is required, a predetermined corrective action for at least one of the plurality of network resources associated with first and second services of said plurality of services;

an instruction generator configured, by the computer system, to generate an instruction to cause the predetermined corrective action to be applied to the network resource to reassign, before a failure of the second service, the at least one of the plurality of network resources from a first service of said plurality of services to a second service of said plurality of services, responsive to priority levels associated with said first and second services.

* * * * *